United States Patent
Wu et al.

(10) Patent No.: US 12,507,279 B2
(45) Date of Patent: Dec. 23, 2025

(54) ACKNOWLEDGMENT FEEDBACK TRANSMISSION FOR SIDELINK COMMUNICATION IN UNLICENSED SPECTRUM

(71) Applicant: QUALCOMM Incorporated, San Diego, CA (US)

(72) Inventors: Shuanshuan Wu, San Diego, CA (US); Arthur Gubeskys, San Diego, CA (US); Stelios Stefanatos, San Diego, CA (US); Kapil Gulati, Belle Mead, NJ (US); Gene Wesley Marsh, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/999,523

(22) PCT Filed: Nov. 18, 2020

(86) PCT No.: PCT/US2020/061084
§ 371 (c)(1),
(2) Date: Nov. 21, 2022

(87) PCT Pub. No.: WO2021/262222
PCT Pub. Date: Dec. 30, 2021

(65) Prior Publication Data
US 2023/0209596 A1    Jun. 29, 2023

(30) Foreign Application Priority Data

Jun. 24, 2020    (GR) ............................. 20200100363

(51) Int. Cl.
*H04W 72/02*    (2009.01)
*H04W 28/16*    (2009.01)
(Continued)

(52) U.S. Cl.
CPC ....... *H04W 74/0808* (2013.01); *H04W 28/16* (2013.01)

(58) Field of Classification Search
CPC . H04W 74/0808; H04W 28/16; H04W 76/14; H04W 72/02; H04L 1/1685; H04L 1/1854; H04L 2001/0092
(Continued)

(56) References Cited

U.S. PATENT DOCUMENTS 10,856,345 B2    12/2020  Gulati et al.
11,395,335 B2 *  7/2022   Lou .................. H04W 74/0808
(Continued)

FOREIGN PATENT DOCUMENTS

CN    110100462 A    8/2019
WO    2019075238     4/2019
(Continued)

OTHER PUBLICATIONS

Interdigital., et al., "On Physical Layer Procedures for NR V2X Sidelink", 3GPP Draft, 3GPP TSG RAN WG1 #97, R1-1907096, On Physical Layer Procedures for NR V2X Sidelink_Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728542, 9 pages, pp. 2-3 The Whole Document.
International Search Report and Written Opinion—PCT/US2020/061084—ISA/EPO—Feb. 9, 2021.

*Primary Examiner* — Christopher M Crutchfield
*Assistant Examiner* — Syed Ahmed
(74) *Attorney, Agent, or Firm* — Dinsmore & Shohl LLP

(57) ABSTRACT

Certain aspects of the present disclosure provide a method for wireless communications by a transmitter UE. The method generally includes transmitting data to at least one receiver UE in an unlicensed spectrum used for sidelink
(Continued)

communication, determining if a resource in a slot is available for the at least one receiver UE to provide acknowledgment feedback for the data transmission, and transmitting a reservation signal in the slot if the resource is determined to be available.

30 Claims, 11 Drawing Sheets

(51) Int. Cl.
  *H04W 74/0808* (2024.01)
  *H04W 76/14* (2018.01)
(58) Field of Classification Search
  USPC .......................................................... 370/329
  See application file for complete search history.

(56) References Cited

U.S. PATENT DOCUMENTS

| | | | | |
|---|---|---|---|---|
| 11,432,369 | B2* | 8/2022 | Xiong | H04L 5/0051 |
| 11,509,433 | B2* | 11/2022 | Kimura | H04L 1/1819 |
| 11,863,969 | B2* | 1/2024 | Tang | H04W 28/16 |
| 2019/0306923 | A1* | 10/2019 | Xiong | H04L 27/261 |
| 2022/0201654 | A1* | 6/2022 | Lee | H04W 72/02 |
| 2022/0264646 | A1* | 8/2022 | Wang | H04W 74/0866 |

FOREIGN PATENT DOCUMENTS

| | | | |
|---|---|---|---|
| WO | 2020033089 | A1 | 2/2020 |
| WO | 2020091566 | A1 | 5/2020 |

* cited by examiner

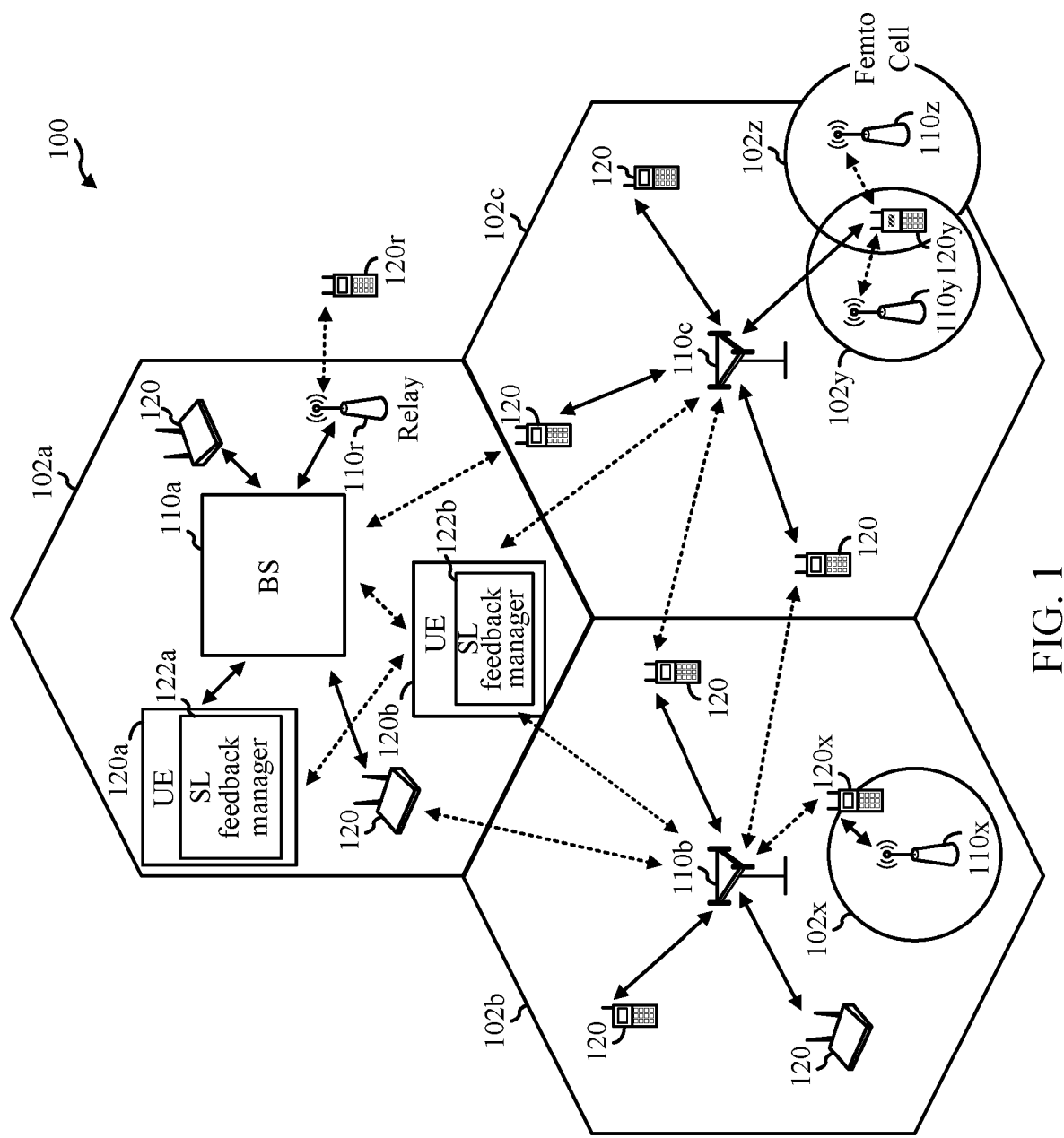
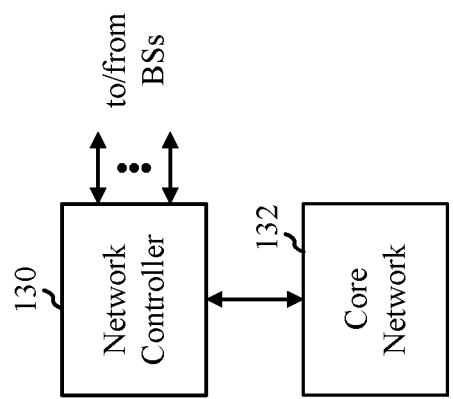
FIG. 1

ACKNOWLEDGMENT FEEDBACK TRANSMISSION FOR SIDELINK COMMUNICATION IN UNLICENSED SPECTRUM

CROSS REFERENCE TO RELATED APPLICATION

This Application is a national stage application under 35 U.S.C. 371 of PCT/US2020/061084 filed Nov. 18, 2020, which hereby claims priority to Greece Provisional Application No. 20200100363, which was filed on Jun. 24, 2020, both assigned to the assignee hereof, and are hereby expressly incorporated by reference herein in their entireties as if fully set forth below and for all applicable purposes.

FIELD OF THE DISCLOSURE

Aspects of the present disclosure relate to wireless communications, and more particularly, to techniques for transmitting acknowledgment feedback in sidelink communications.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved acknowledgment feedback transmission for sidelink communications.

Certain aspects of the subject matter described in this disclosure can be implemented in a method for wireless communication by a transmitter user equipment (UE). The method generally includes transmitting data to at least one receiver UE in an unlicensed spectrum used for sidelink communication, determining if a resource in a slot is available for the at least one receiver UE to provide an acknowledgment feedback for the data transmission, and transmitting a reservation signal in the slot if the resource is determined to be available.

Certain aspects of the subject matter described in this disclosure can be implemented in a method for wireless communications by a receiver user equipment (UE). The method generally includes receiving a data transmission from at least one transmitter UE in an unlicensed spectrum used for sidelink communication, monitoring for a reservation signal from the transmitter UE indicating a resource in a slot is available for the receiver UE to provide an acknowledgment feedback for the data transmission, and transmitting the acknowledgment feedback for the data transmission if the reservation signal is detected.

Certain aspects of the subject matter described in this disclosure can be implemented in a transmitter user equipment (UE). The transmitter UE generally includes means for transmitting data to at least one receiver UE in an unlicensed spectrum used for sidelink communication, means for determining if a resource in a slot is available for the at least one receiver UE to provide an acknowledgment feedback for the data transmission, and means for transmitting a reservation signal in the slot if the resource is determined to be available.

Certain aspects of the subject matter described in this disclosure can be implemented in a receiver user equipment (UE). The receiver UE generally includes means for receiving a data transmission from at least one transmitter UE in an unlicensed spectrum used for sidelink communication, means for monitoring for a reservation signal from the at least one transmitter UE indicating a resource in a slot is available for the receiver UE to provide an acknowledgment feedback for the data transmission, and means for transmitting the acknowledgment feedback for the data transmission if the reservation signal is detected.

Certain aspects of the subject matter described in this disclosure can be implemented in a transmitter user equipment (UE). The transmitter UE generally includes a transmitter configured to transmit data to at least one receiver UE in an unlicensed spectrum used for sidelink communication and a processing system configured to determine if a resource in a slot is available for the at least one receiver UE to provide an acknowledgment feedback for the data transmission, wherein the transmitter is further configured to transmit a reservation signal in the slot if the resource is determined to be available.

Certain aspects of the subject matter described in this disclosure can be implemented in a receiver user equipment (UE). The receiver UE generally includes a receiver configured to receive a data transmission from at least one transmitter UE in an unlicensed spectrum used for sidelink communication, a processing system configured to monitor for a reservation signal from the at least one transmitter UE indicating a resource in a slot is available for the receiver UE to provide an acknowledgment feedback for the data transmission, and a transmitter configured to transmit the acknowledgment feedback for the data transmission if the reservation signal is detected.

Certain aspects of the subject matter described in this disclosure can be implemented in an apparatus for wireless communications. The apparatus generally includes an interface configured to output data for transmission to at least one user equipment (UE) in an unlicensed spectrum used for sidelink communication and a processing system configured to determine if a resource in a slot is available for the at least one UE to provide an acknowledgment feedback for the data transmission, wherein the interface is further configured to output a reservation signal for transmission in the slot if the resource is determined to be available.

Certain aspects of the subject matter described in this disclosure can be implemented in an apparatus for wireless communications by a receiver user equipment (UE). The apparatus generally includes an interface configured to obtain a data transmission from at least one transmitter UE in an unlicensed spectrum used for sidelink communication and a processing system configured to monitor for a reservation signal from the at least one transmitter UE indicating a resource in a slot is available for the receiver UE to provide an acknowledgment feedback for the data transmission, wherein the interface is further configured to provide the acknowledgment feedback for the data transmission if the reservation signal is detected.

Certain aspects of the subject matter described in this disclosure can be implemented in a computer-readable medium for wireless communications. The computer-readable medium generally includes codes executable to transmit data to at least one receiver UE in an unlicensed spectrum used for sidelink communication, determine if a resource in a slot is available for the at least one receiver UE to provide an acknowledgment feedback for the data transmission, and transmit a reservation signal in the slot if the resource is determined to be available.

Certain aspects of the subject matter described in this disclosure can be implemented in a computer-readable medium for wireless communications by a receiver user equipment (UE). The computer-readable medium generally includes codes executable to receive a data transmission from at least one transmitter UE in an unlicensed spectrum used for sidelink communication, monitor for a reservation signal from the at least one transmitter UE indicating a resource in a slot is available for the receiver UE to provide an acknowledgment feedback for the data transmission, and transmit the acknowledgment feedback for the data transmission if the reservation signal is detected.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example telecommunications system, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 2:
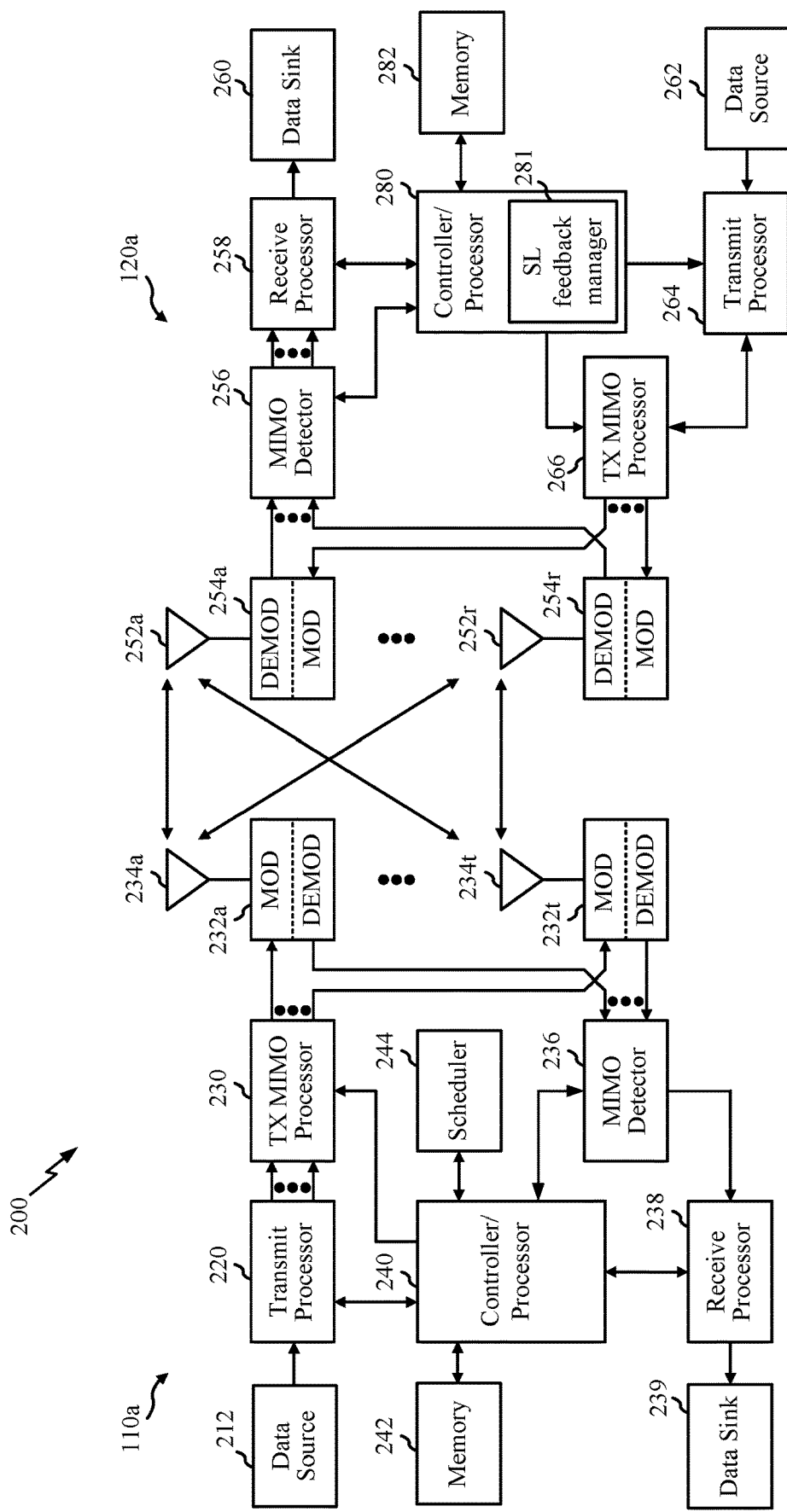
FIG. 2 is a block diagram conceptually illustrating a design of an example a base station (BS) and user equipment (UE), in accordance with certain aspects of the present disclosure.

Aspects of the present disclosure relate to wireless communications, and more particularly, to techniques for transmitting acknowledgment feedback in sidelink communications using unlicensed spectrum.

In New Radio (NR), a user equipment (UE) may exchange sidelink data (e.g., user data and control signaling) with other UEs directly and without the help (e.g., relaying) of a base station. This type of sidelink communication is often called peer-to-peer (also referred to as device-to-device or D2D) communication. An example of peer-to-peer communication includes vehicle to everything (V2X) communication where a vehicle may communicate with another vehicle (V2V) or a different device, such as a base station, a traffic control system, or the like.

One challenge in V2X systems is to acknowledge the safe receipt of sidelink data by a receiving UE (may also be referred to as an Rx UE). That is, in order to improve sidelink communications, an Rx UE may need to send a positive (or negative) feedback (e.g., a hybrid automatic repeat request (HARQ) feedback) to the transmitting UE (may also be referred to as a Tx UE) acknowledging the successful (or unsuccessful) receipt of the data. For example, when the Rx UE is not successful in decoding the data received from the Tx UE, the Rx UE may need to send a negative acknowledgment (NACK) feedback to the Tx UE to indicate to the Tx UE that the data transmission was not successful.

The following description provides examples of HARQ feedback transmissions in sidelink communications, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHZ or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 is a block diagram conceptually illustrating an example wireless communication network 100, in which certain aspects of the present disclosure may be practiced. For example, UEs 120a and 120b may include, among other modules/managers, sidelink (SL) feedback managers 122a and 122b, respectively, configured to perform operations 600 of FIG. 6 and operations 700 of FIG. 7 described below.

Wireless communication network 100 may be, for example, an NR system (e.g., a 5G NR network). As shown in FIG. 1, the wireless communication network 100 may be in communication with a core network 132. The core network 132 may in communication with one or more base station (BSs) 110 and/or user equipments (UEs) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a may have an SL feedback manager 281 configured for (HARQ) feedback transmissions, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
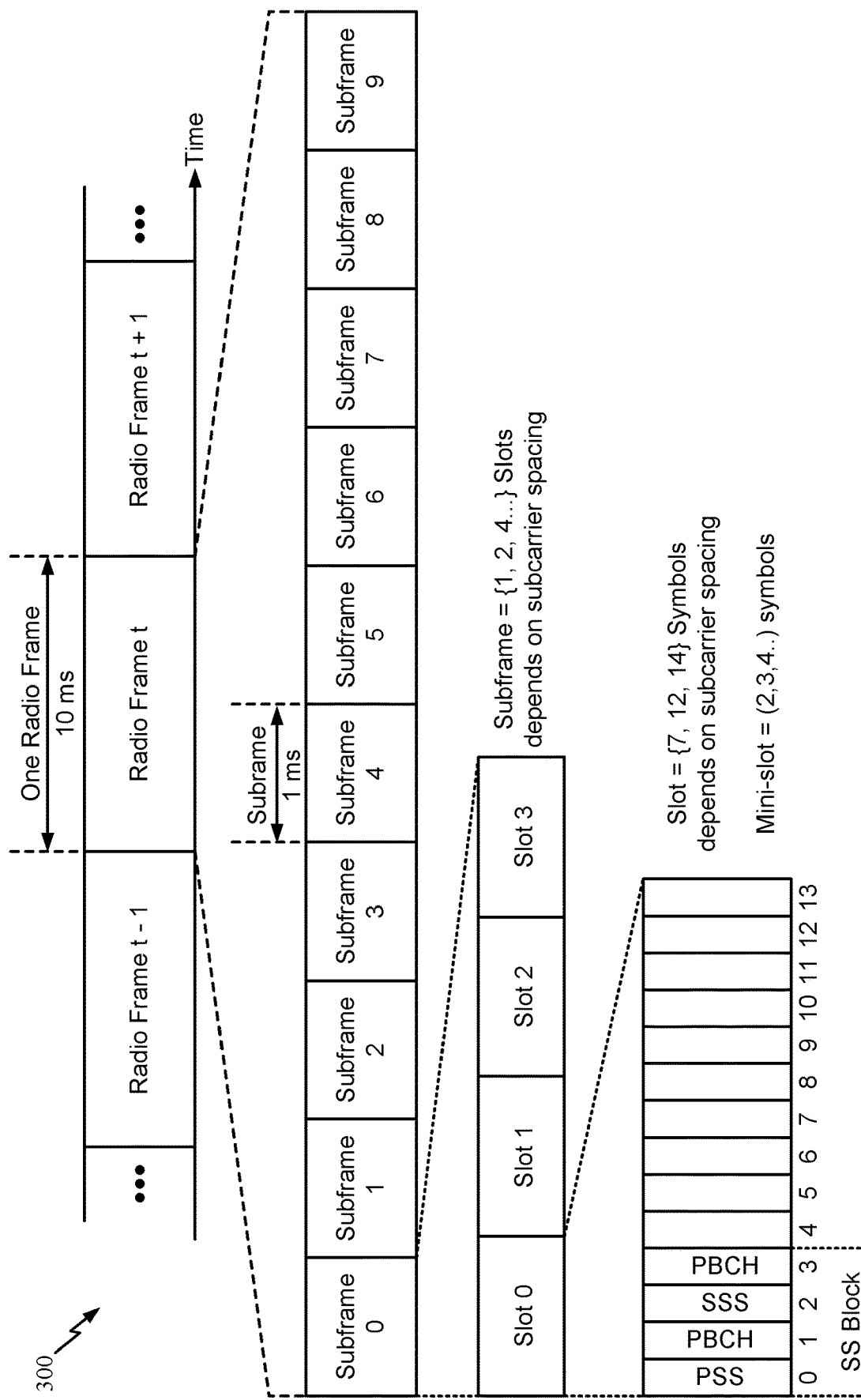
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, while the SS may provide the CP length and frame timing. The PSS and SSS may provide the cell identity. The PBCH carries some basic system information, such as downlink system bandwidth, timing information within radio frame, SS burst set periodicity, system frame number, etc.

The SSBs may be organized into SS bursts to support beam sweeping. Further system information, such as remaining minimum system information (RMSI), system information blocks (SIBs), other system information (OSI) may be transmitted on a physical downlink shared channel (PDSCH) in certain subframes. The SSB may be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets may be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a, as shown in FIG. 1) to another subordinate entity (e.g., UE122a UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling, such as sidelink resource configurations and other parameters used for data transmissions, and the PSSCH may carry the data transmissions. The PSFCH may carry sidelink feedbacks, such as distance-based and/or non-distance-based HARQ feedbacks related to data transmissions between two or more UEs that are in direct communication with each other.

Figure 4:
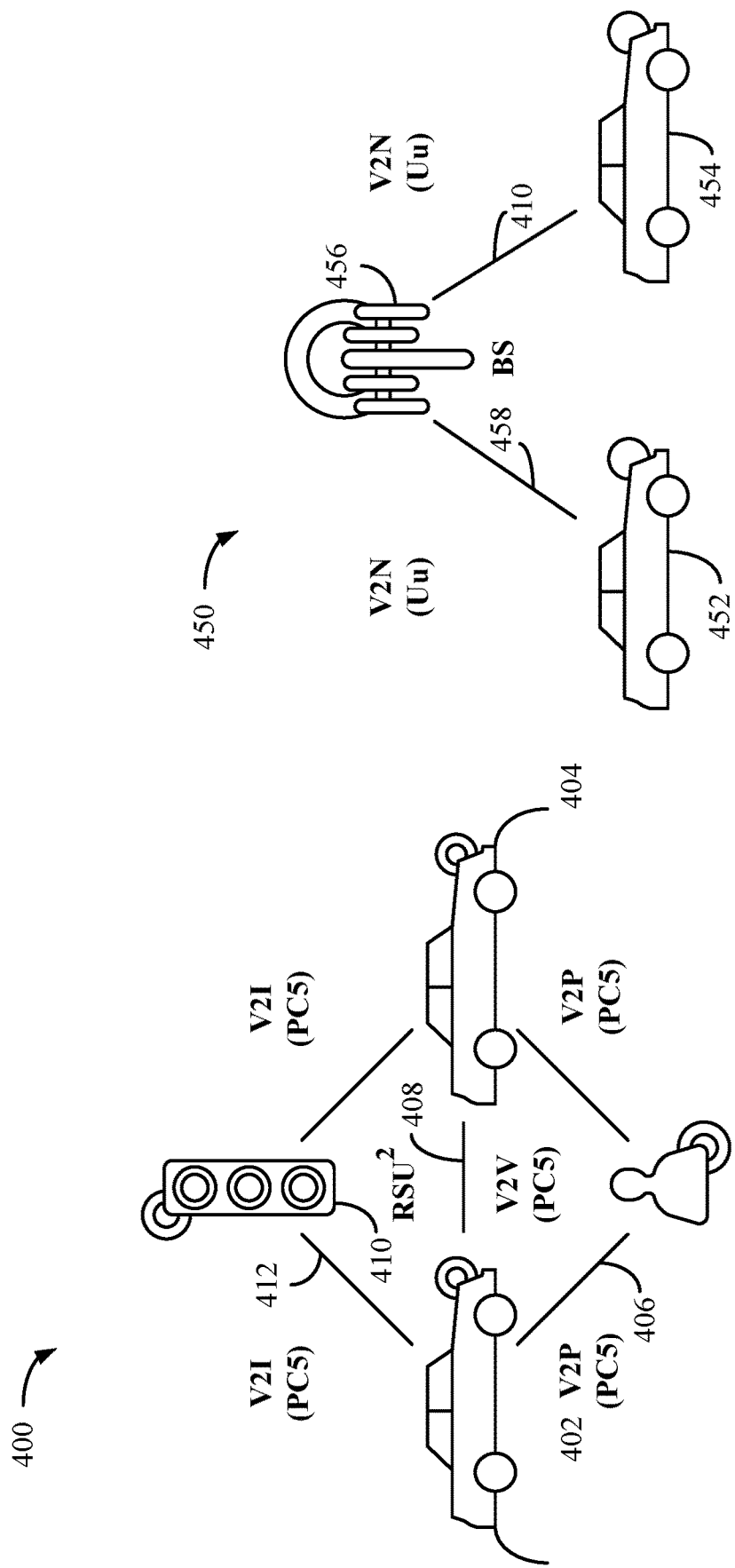
FIG. 4A and FIG. 4B illustrate diagrammatic representations of example vehicle to everything (V2X) systems, in accordance with certain aspects of the present disclosure.

FIG. 4A and FIG. 4B show diagrammatic representations of example V2X systems, in accordance with some aspects of the present disclosure. For example, the vehicles shown in FIG. 4A and FIG. 4B may perform data transmissions via sidelink channels and may receive sidelink feedbacks regarding those data transmissions, as described herein.

The V2X systems that are shown in FIG. 4A and FIG. 4B provide two complementary transmission modes. A first transmission mode, shown by way of example in FIG. 4A, may involve direct communications (may also be referred to as sidelink communications) between participants in proximity to one another in a local area. Sidelink transmissions by the UEs (e.g., Vehicles 402 and 404, or traffic light 410) may implemented over a PC5 interface (e.g., a wireless communication interface between a first UE and a second UE). A second transmission mode, shown by way of example in FIG. 4B, may involve network communications through a network, which may be implemented over a Uu interface (e.g., a wireless communication interface between a radio access network (RAN) and a UE).

Referring to FIG. 4A, a V2X system 400 (e.g., vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (e.g., with a mobile phone of the individual) through a PC5 interface. Communications between the vehicles 402 and 404 may also occur through a PC5 interface 408. In a like manner, communication may occur from a vehicle 402 to other highway components (e.g., highway component 410), such as a traffic signal or sign (V2I) through a PC5 interface 412. With respect to each communication link illustrated in FIG. 4A, two-way communication may take place between elements, therefore each element may be a transmitter and a receiver of information.

The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed and/or unlicensed spectrum, thus any vehicle with an equipped system may access a common frequency and share information. Such harmonized/common spectrum operations may allow for safe and reliable operations.

FIG. 4B shows a V2X system 450 for communication between a vehicle 452 and a vehicle 454 through a network entity 456. These network communications may occur through discrete nodes, such as a BS (e.g., the BS 110a shown in FIG. 1), that sends and receives information to and from (or relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Example HARQ Feedback Transmission for
Sidelink Communication in Unlicensed Spectrum Aspects of the present disclosure relate to wireless communications, and more particularly, to techniques for transmitting acknowledgment feedback in sidelink communications using unlicensed spectrum.

Current cellular V2X communication designs target deployments in licensed spectrum. Such designs typically either share spectrum in a licensed cellular band or dedicated ITS (intelligent transportation system) spectrum. In the licensed cellular spectrum, V2X systems share uplink spectrum in a cellular network. In dedicated ITS spectrum there are spectrums around 5.9 GHz allocated for V2X in some regions.

The dedicated spectrum is not guaranteed in some regions due to scarcity of spectrum. For example, in some areas/countries, there is dedicated spectrum allocated for LTE V2X (specified in LTE Release-14 and Release-15), but no spectrum available for NR V2X (specified in NR Release-16 targeting advanced V2X use cases like autonomous driving).

As a result, it is likely that cellular V2X communications will be deployed in unlicensed spectrum, given that it might be the only option in some regions. However, unlicensed spectrum may be shared by other technologies like Wi-Fi. Currently, 3GPP has no provision for such unlicensed operation of cellular V2X which may be due to various factors (e.g., considering regulatory requirements for unlicensed spectrum like listen-before-talk (LBT), channel occupation limitation, etc.).

For V2X (or generally sidelink/D2D) communication in unlicensed spectrum, it may be desirable to enable HARQ feedback as a mechanism to help guarantee service quality. In such cases, a data transmitter UE may retransmit a packet if a previous transmission failed (e.g., as indicated if a NACK feedback is received).

Implementation of sidelink HARQ feedback transmission may depend on a particular transmission mode. For example, for a unicast transmission mode, a single receiver UE transmits HARQ feedback. For groupcast (broadcast/multicast) transmission, multiple receiver UEs may transmit HARQ feedback for the same data Tx.

Use of unlicensed spectrums is typically subject to various regulatory requirements depending on the region. One of the requirements is listen before talk (LBT): which mandates that a device only transmits (talk) in an unlicensed channel if the channel is sensed (by listening) to be free. LBT may mean that the device performs a clean channel assessment (CCA) that involves measuring energy or power in the channel for a certain duration of time. Exactly when devices transmit may depend on a particular category of LBT. For a category 2 (CAT 2) LBT, the device transmits if the CCA indicates the channel is free; e.g., Type 2 channel access procedures as specified in 3GPP. For a category 4 (CAT 4) LBT, the device performs random back-off within a contention window (extended CCA) if CCA indicates the channel is free, and transmits only when channel is still free during the back-off period; e.g., Type 1 channel access procedures as specified in 3GPP.

Sidelink HARQ feedback transmission in unlicensed spectrum is also subject to availability of the channel. This restriction may be more challenging considering the feedback transmission in groupcast communication.

Figure 5:
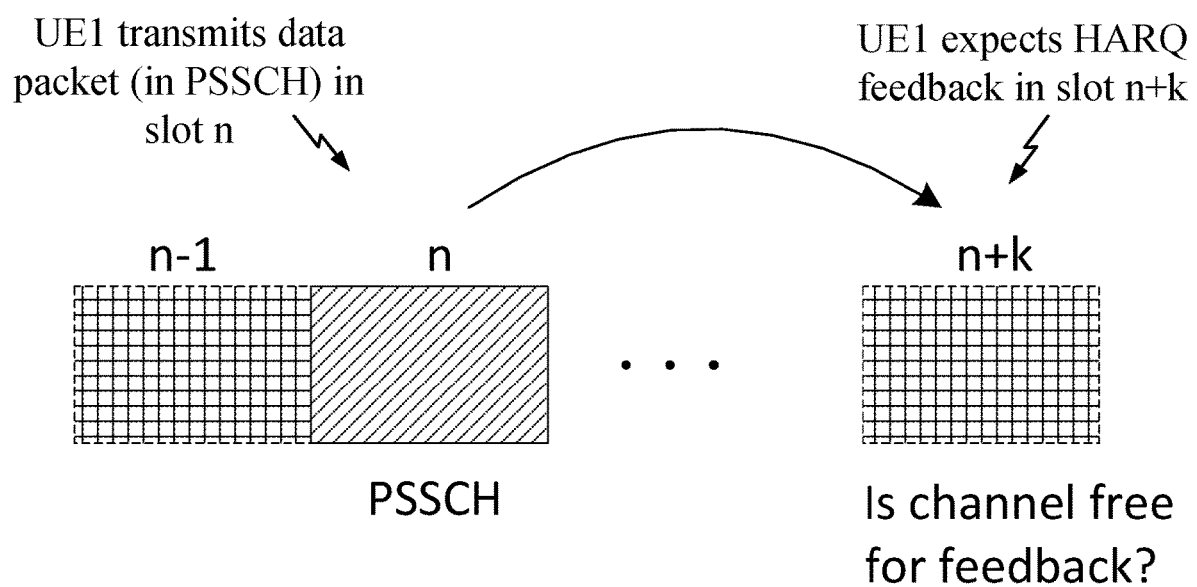
FIG. 5 illustrates example resources for sidelink communications.

FIG. 5 illustrates an example sidelink HARQ feedback timeline. In the illustrated example, UE1 transmits a data packet (e.g., in PSSCH) in slot n and expects HARQ feedback from one (unicast) or multiple (groupcast) receiving UEs in slot n+k. The scheduling parameter k allows a receiver UE a certain amount of time to decode the data transmission. In other words, the receiver UE may not be able to transmit HARQ feedback immediately following the data channel reception.

In the example of FIG. 5, if a receiver UE receives data transmission in slot n and HARQ feedback processing (data channel decoding and HARQ signal generation) time requires k slots, the receiver UE will not be able to transmit HARQ feedback earlier than slot n+k.

As noted above, however, HARQ feedback transmission may also be subject to LBT. For example, when the data transmission ends in slot n but HARQ feedback transmission will not happen until slot n+k, there will be a gap between data transmission and HARQ feedback transmission. If the gap is larger than a threshold time (e.g., 16 us), LBT channel sensing may be needed to make sure that the channel is (still) available for HARQ feedback transmission (it is likely in many scenarios that the processing time is much larger than 16 us).

Aspects of the present disclosure provide a HARQ feedback transmission mechanism for V2X communication in unlicensed/shared spectrum. As will be described in greater detail below, following a data transmission a transmitter UE (Tx UE) may perform channel sensing to determine if a sidelink resource is available for HARQ feedback and can send a reservation signal to reserve the resource and indicate availability to one or more receiver (Rx) UEs.

Figure 6:
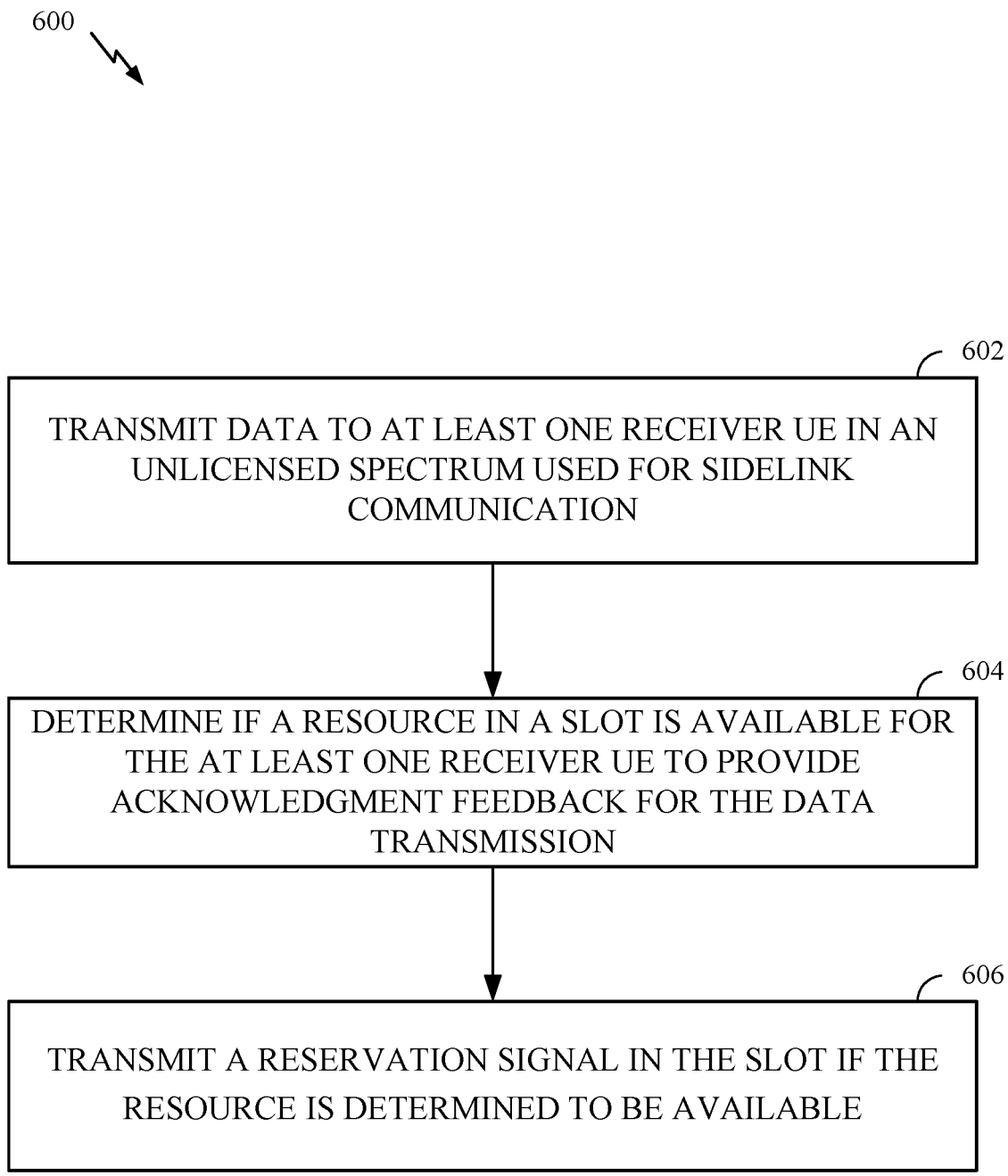
FIG. 6 illustrates example operations for wireless communications by a transmitter user equipment (UE), in accordance with certain aspects of the present disclosure.
Figure 7:
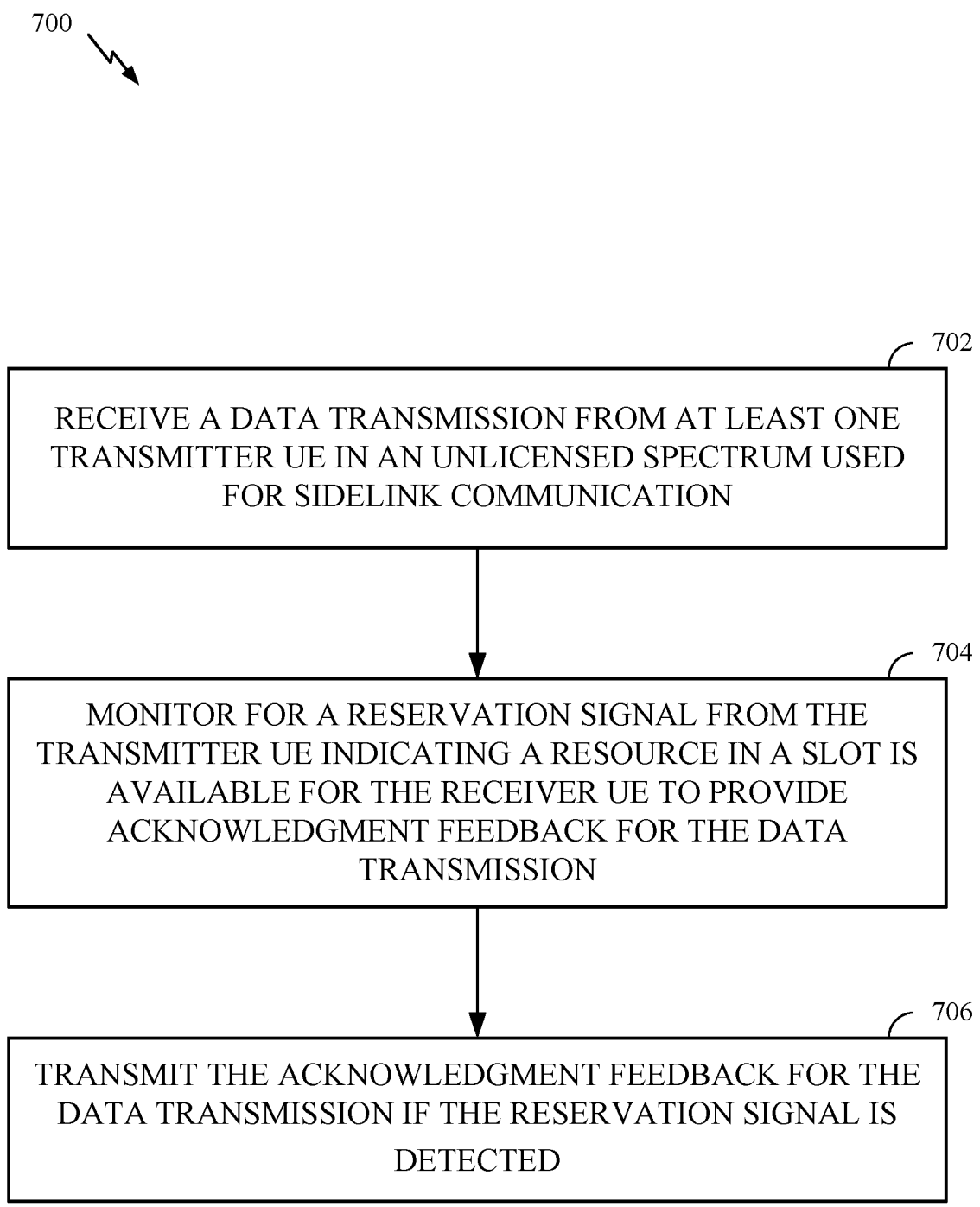
FIG. 7 illustrates example operations for wireless communications by a receiver UE, in accordance with certain aspects of the present disclosure.

FIGS. 6 and 7 illustrate operations 600 and 700 for HARQ feedback from a Tx UE and Rx UE, respectively. These operations may be understood with reference to the example sidelink HARQ timeline shown in FIG. 8.

FIG. 6 illustrates example operations 600 for wireless communications by a transmitter UE, in accordance with certain aspects of the present disclosure. Operations 600 may be performed, for example, by a Tx UE (e.g., such as UE 120a in the wireless communication network 100, as shown in FIG. 1) to transmit sidelink data and signal a receiver UE whether resources are available for acknowledging the data.

Figure 8:
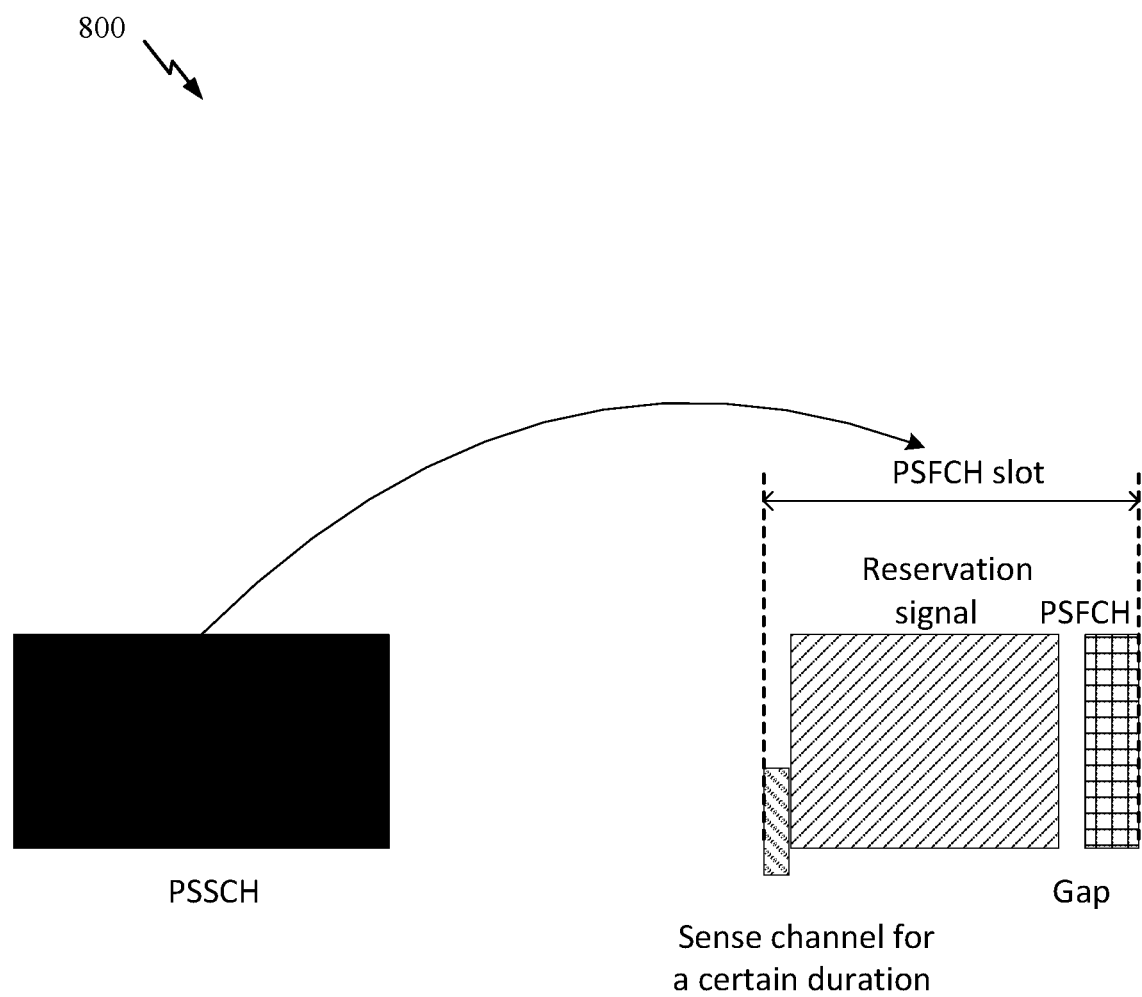
FIG. 8 illustrates an example timeline for acknowledgment feedback for sidelink communications, in accordance with certain aspects of the present disclosure.

Operations 600 begin, at 602, by transmitting data to at least one receiver UE in an unlicensed spectrum used for sidelink communication. As shown in FIG. 8, the data may be transmitted in a PSSCH. One or multiple Rx UEs may be receiving the data transmission from the Tx UE.

At 604, the transmitter UE determines if a resource in a slot is available for the at least one receiver UE to provide acknowledgment feedback for the data transmission. At 606, the transmitter UE transmits a reservation signal in the slot if the resource is determined to be available.

As shown in FIG. 8, following data transmission, the Tx UE senses the channel to determine if resource is available for HARQ feedback transmission. If the channel (e.g., in a PSFCH slot) is determined to be free based on sensing, the Tx UE transmits a reservation signal in the PSFCH slot (to reserve the resource and indicate availability to one or more Rx UEs).

FIG. 7 illustrates example operations 700 for wireless communications by a receiver UE and may be considered complementary to operations 600 of FIG. 7. For example, operations 700 may be performed by a Rx UE (e.g., such as UE 120b in the wireless communication network 100, as shown in FIG. 1) to receive sidelink data from a Tx UE (performing operations 600 of FIG. 6, monitor for an indication resources are available for acknowledging the data, and transmit acknowledgment if the resources are available.

Operations 700 begin, at 702, by receiving a data transmission from at least one transmitter UE in an unlicensed spectrum used for sidelink communication. At 704, the receiver UE monitors for a reservation signal from the transmitter UE indicating a resource in a slot is available for the receiver UE to provide acknowledgment feedback for the data transmission; alternatively, the receiver UE monitors for a reservation signal from the transmitter UE triggering the receiver UE to provide acknowledgment feedback for the data transmission. At 706, the receiver UE transmits the acknowledgment feedback for the data transmission if the reservation signal is detected.

There are various alternatives for determining slots for sidelink HARQ feedback. For example, according to a first alternative, slots may be configured for HARQ feedback transmission (e.g., via RRC signaling) or pre-configured. In this case, the Tx UE senses in one of the configured HARQ feedback slots to determine if it is free. According to a second alternative, there may be no dedicated slots for HARQ feedback transmission. In this case, the Tx UE senses in a slot determined based on a (pre) configured/pre-defined HARQ timeline. For example, the parameter k in determining the HARQ timeline has a configured or pre-configured value; the Tx UE or Rx UE determines the slot to be used for HARQ feedback transmission based on the k value.

In either case, if the Tx UE determines the channel to be free based on sensing, the Tx UE transmits reservation signal in the slot. As noted above, the reservation signal serves two general purposes. First, the transmission of the reservation signal reserves the resource as other devices that sense the reservation signal will defer their transmissions. For example, when a Wi-Fi device senses the channel, it will see a busy channel (due to the reservation signal) and, thus, the later HARQ feedback transmission would not be interfered with.

Second, the reservation signal will trigger the Rx UE(s) to transmit their HARQ feedback. An Rx UE, it will detect reservation signal in the HARQ feedback slot based on one of the alternatives discussed above: the HARQ feedback slot may be determined based on a HARQ timeline or a HARQ slot (pre) configuration (and HARQ timeline). The Rx UE may transmit HARQ feedback if a reservation signal is detected (as illustrated in FIG. 8).

For the Tx UE, the channel sensing may be energy detection based CCA (clean channel assessment). In such cases, the channel may be considered free if the energy (or power) measured during the sensing period is smaller than a threshold.

If the Tx UE senses the channel to be free, it may transmit the reservation signal according to various options. According to a first option, the Tx UE may just sense the channel for a (pre) determined period of time and transmit the reservation signal immediately if the energy/power measured during this period is below the threshold. The channel sensing may be performed in a sensing window having pre-determined location and size (e.g., a window of 16 us). In one example, the sensing window is a time window in the HARQ feedback slot (e.g., as shown in FIG. 8); in another example, the sensing window may be at the end of the slot preceding the HARQ feedback. According to a second option, the Tx UE performs a back-off (e.g., a random back-off within a contention window, similar to the CAT 4 LBT noted above) and the Tx UE transmits the reservation signal if the channel is free during the contention window.

Figure 9:
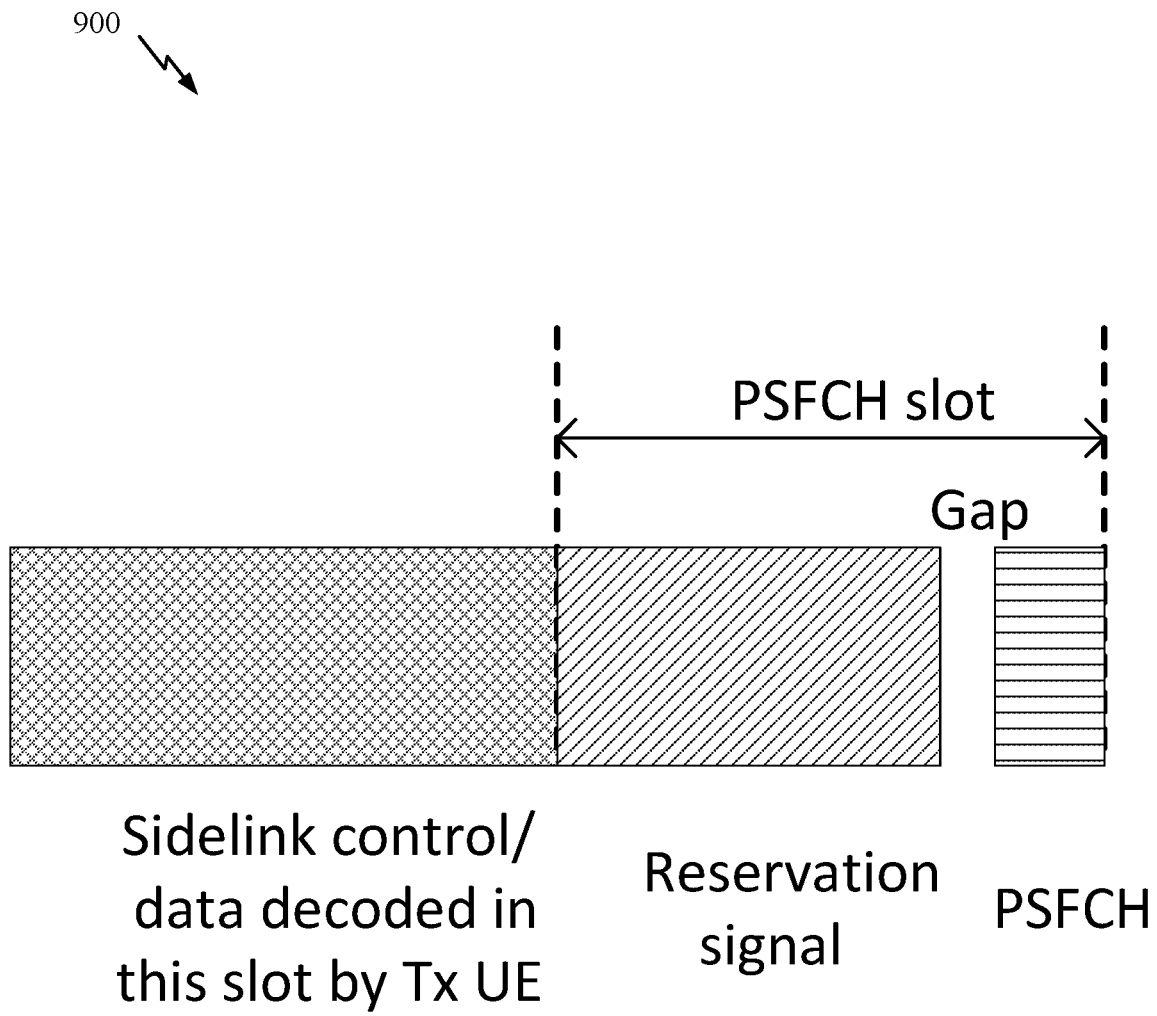
FIG. 9 illustrates another example timeline for acknowledgment feedback for sidelink communications, in accordance with certain aspects of the present disclosure.

As illustrated in FIG. 9, in some cases, energy sensing by Tx UE may not be needed. For example, the HARQ feedback slot may fall within a COT (channel occupancy time) initiated by the Tx UE (or another UE). In such cases, the Tx UE may determine that the previous slot (the slot before the PSFCH/HARQ feedback slot) or previous symbols (the symbols before the symbols configured for PSFCH/HARQ feedback transmission in a HARQ feedback back) has been occupied by a sidelink transmission (either the Tx UE's sidelink transmission or sidelink transmission from other UEs) and the Tx UE can just transmits the reservation signal in the HARQ feedback slot. For the case that the Tx UE determines the previous slot or symbols has transmission(s) from other UE(s), the Tx UE may have decoded a sidelink control signal or data transmission from another UE. As illustrated, the Rx UE may transmit HARQ feedback (in a PSFCH) a gap after the reservation signal.

In some cases, HARQ feedback transmission slots may be (pre) configured in a periodic manner. For example, one slot may be (pre) configured for HARQ feedback transmission in every N slots (e.g., N=2, 4, etc.). In such cases, the sensing and reservation signal transmissions occur within the (pre) configured HARQ feedback slots. The HARQ timeline may be, the Tx UE senses (and transmits the reservation signal) in a first HARQ feedback slot that is not earlier than slot n+k (as shown in FIG. 5, where n is the data transmission slot and k is a (pre) defined/(pre) configured scheduling parameter value for HARQ timeline.

In some cases, there may not be a dedicated slot for HARQ feedback transmission. In such cases, there are various alternatives for determining the HARQ feedback slot.

According to a first alternative, the Tx UE and Rx UE determine the slot for HARQ feedback transmission based on (pre) defined/(pre) configured HARQ timeline (for example, a (pre) defined HARQ timeline is n+k, where k has a (pre) defined value. In other words, for a data transmission ending in slot n, the first slot that may have the HARQ feedback transmission for the corresponding data is slot n+k and the Tx UE will sense and transmit reservation signal in slot n+k.

According to a second alternative, the Tx UE indicates a HARQ feedback timeline when transmitting data. For example, the Tx UE may indicate the k value in sidelink control information (SCI) that schedules the data transmission or in some other SCI transmission.

The Tx UE has various options when the feedback slot is sensed as busy. In some cases, the reservation signal can be common to all UEs. In such cases, as long as the reservation signal is detected by the Rx UE (from any UE), that Rx UE knows the channel has been reserved for sidelink transmission, and it can transmit its HARQ feedback. This may mean that, although a specific Tx UE may see busy channel, another Tx UE may not, and this other Tx UE transmits its reservation signal in the HARQ feedback slot. This may assume that data transmission/HARQ feedback transmission may be multiplexed in a same slot in a frequency division multiplexed (FDM) manner (e.g., meaning multiple UEs may transmit in same slot concurrently).

In one case (Case 1), if the Rx UE has detected the reservation signal (from this Tx UE or different Tx UE), the Rx UE will transmit HARQ feedback in the feedback resource within the feedback slot. In such cases, the Tx UE will always detect the HARQ feedback transmission in the feedback resource within the feedback slot, no matter whether it successfully transmitted the reservation signal.

In another case (Case 2), the channel may be truly busy such that the Rx UE is not able to detect any reservation signal in the feedback slot. In this case, the Rx UE may not transmit HARQ feedback in this feedback slot (as the Tx UE would not be able to decode HARQ feedback in this feedback slot). In such cases, the HARQ feedback could simply be dropped by the Rx UE or a HARQ feedback transmission window could be defined to accommodate such scenarios.

For example, such a HARQ feedback transmission window could be comprised of one or multiple HARQ feedback slots. For a data transmission, its HARQ feedback will be mapped to HARQ feedback window. If the HARQ feedback window has multiple HARQ feedback slots, the Tx UE may sense the next slot in the window if its HARQ feedback is not detected in the current slot in the feedback window.

There are various options for transmitting the reservation signal. For example, the reservation signal may be a sub-band signal that is transmitted in part of frequency resource (RBs/sub-channels). In some cases, the reservation signal may be transmitted in the same frequency location that HARQ feedback will be transmitted. In some cases, multiple Tx UEs may transmit reservation signals in one HARQ feedback slot (e.g., via FDM). Similarly, for the HARQ feedback transmission, HARQ feedback transmission for different data transmissions may be FDMed in a same HARQ feedback slot.

Channel sensing (by a Tx UE) as proposed herein may help ensure that there is no interference between sidelink HARQ feedback transmission and transmission from other technologies (e.g., Wi-Fi) sharing the same unlicensed spectrum. As described herein, channel sensing performed by the Tx UE, and the triggering of HARQ feedback transmission by the reservation signal sent by Tx UE, may help ensure that HARQ feedbacks from multiple receiver UEs would be transmit in the same HARQ feedback resource (time or time/frequency resource) in groupcast communication.

Figure 10:
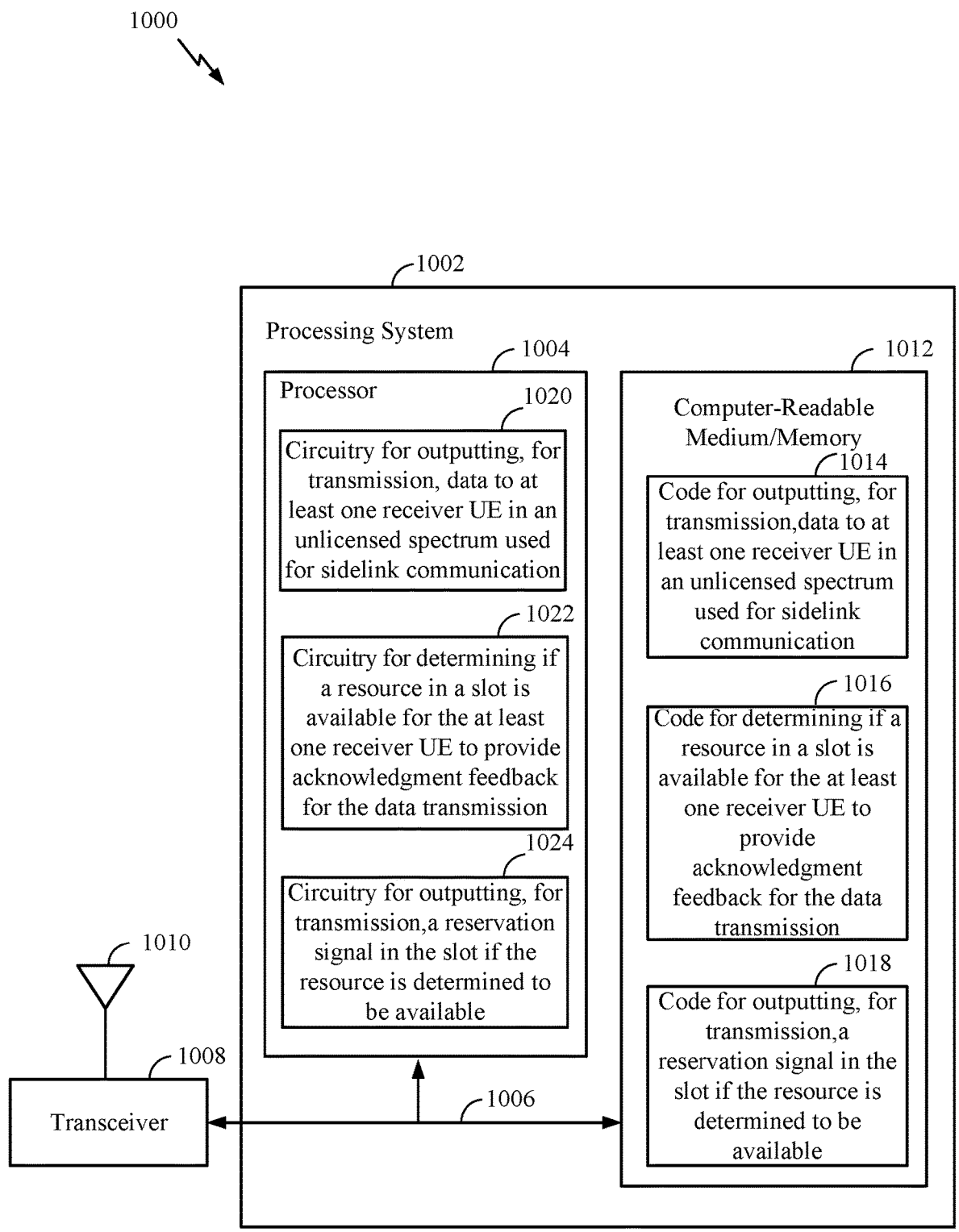
FIG. 10 illustrates a communications device that may include various components configured to perform operations for techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 6. The communications device 1000 may include a processing system 1002 coupled to a transceiver 1008 (e.g., a transmitter and/or a receiver). The transceiver 1008 may be configured to transmit and receive signals for the communications device 1000 via an antenna 1010, such as the various signals as described herein. The processing system 1002 may be configured to perform processing functions for the communication device 1000, including processing signals received and/or to be transmitted by the communications device 1000.

The processing system 1002 may include a processor 1004 coupled to a computer-readable medium/memory 1012 via a bus 1006. In certain aspects, the computer-readable medium/memory 1012 may be configured to store instructions (e.g., computer-executable code) that when executed by the processor 1004, cause the processor 1004 to perform the operations illustrated in FIG. 6, or other operations for performing the various techniques discussed herein. In certain aspects, computer-readable medium/memory 1012 may store code 1014 for outputting, for transmission, data to at least one receiver UE in an unlicensed spectrum used for sidelink communication; code 1016 for determining if a resource in a slot is available for the at least one receiver UE to provide acknowledgment feedback for the data transmission; and/or code 1018 for outputting, for transmission, a reservation signal in the slot if the resource is determined to be available.

In certain aspects, the processor 1004 may have circuitry configured to implement the code stored in the computer-readable medium/memory 1012. The processor 1004 may include circuitry 1020 for outputting, for transmission, data to at least one receiver UE in an unlicensed spectrum used for sidelink communication; circuitry 1022 for determining if a resource in a slot is available for the at least one receiver UE to provide acknowledgment feedback for the data transmission; and/or circuitry 1024 for outputting, for transmission, a reservation signal in the slot if the resource is determined to be available.

Figure 11:
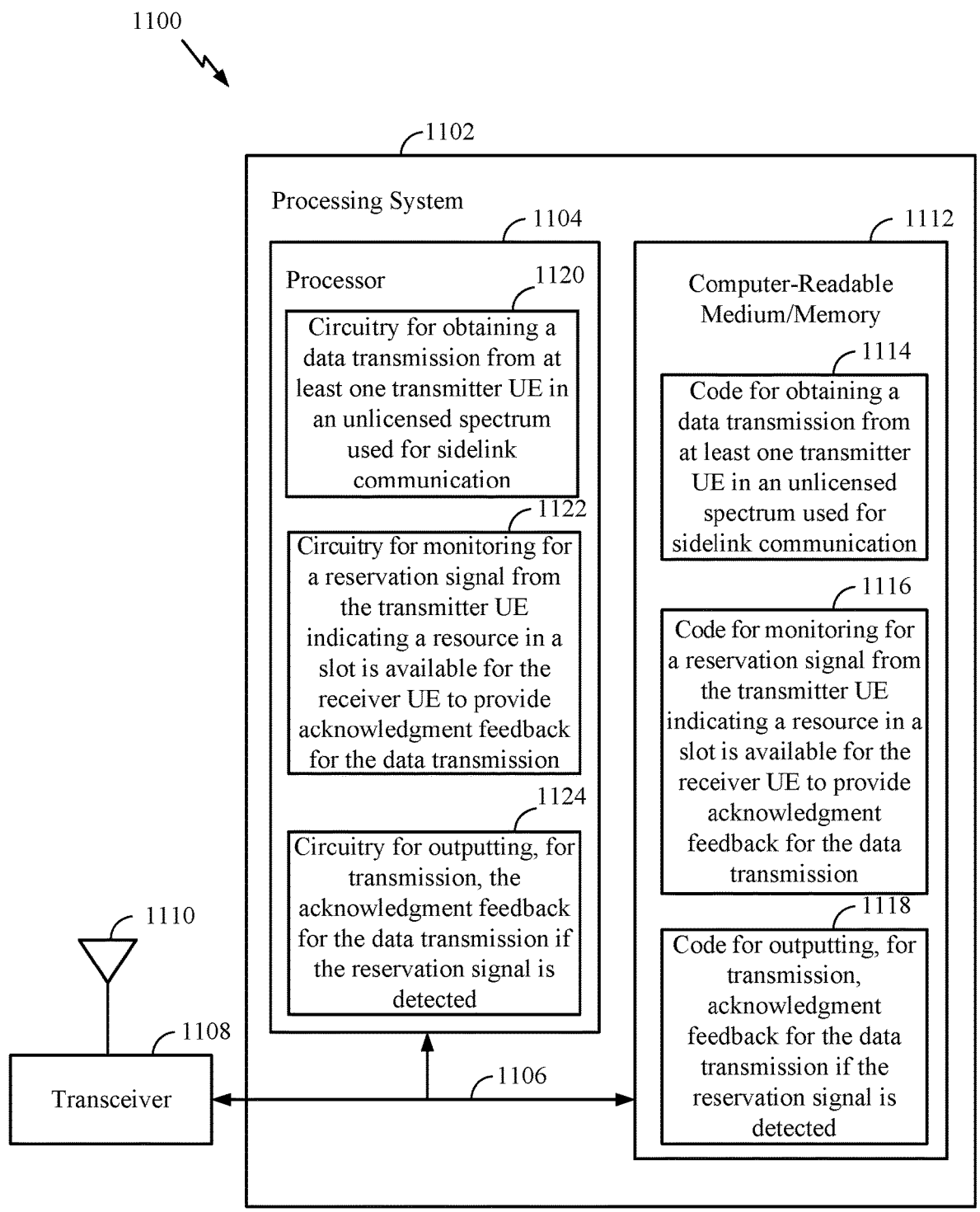
FIG. 11 illustrates a communications device that may include various components configured to perform operations for techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 7. The communications device 1100 may include a processing system 1102 coupled to a transceiver 1108 (e.g., a transmitter and/or a receiver). The transceiver 1108 may be configured to transmit and receive signals for the communications device 1100 via an antenna 1110, such as the various signals as described herein. The processing system 1102 may be configured to perform processing functions for the communication device 1100, including processing signals received and/or to be transmitted by the communications device 1100.

The processing system 1102 may include a processor 1104 coupled to a computer-readable medium/memory 1112 via a bus 1106. In certain aspects, the computer-readable medium/memory 1112 may be configured to store instructions (e.g., computer-executable code) that when executed by the processor 1104, cause the processor 1104 to perform the operations illustrated in FIG. 7, or other operations for performing the various techniques discussed herein. In certain aspects, computer-readable medium/memory 1112 may store code 1114 for obtaining a data transmission from at least one transmitter UE in an unlicensed spectrum used for sidelink communication; code 1116 for monitoring for a reservation signal from the transmitter UE indicating a resource in a slot is available for the receiver UE to provide acknowledgment feedback for the data transmission; and/or code 1118 for outputting, for transmission, the acknowledgment feedback for the data transmission if the reservation signal is detected.

In certain aspects, the processor 1104 may have circuitry configured to implement the code stored in the computer-readable medium/memory 1112. The processor 1104 may include circuitry 1120 for obtaining a data transmission from at least one transmitter UE in an unlicensed spectrum used for sidelink communication; circuitry 1122 for monitoring for a reservation signal from the transmitter UE indicating a resource in a slot is available for the receiver UE to provide acknowledgment feedback for the data transmission; and/or circuitry 1124 for outputting, for transmission, the acknowledgment feedback for the data transmission if the reservation signal is detected.

In addition to the various aspects described above, aspects of specific combinations are within the scope of the disclosure, some of which are detailed below:

Aspect 1. A method for wireless communications by a transmitter user equipment (UE), comprising: transmitting data to at least one receiver UE in an unlicensed spectrum used for sidelink communication; determining if a resource in a slot is available for the at least one receiver UE to provide an acknowledgment feedback for the data transmission; and transmitting a reservation signal in the slot if the resource is determined to be available.

Aspect 2: The method of Aspect 1, wherein the reservation signal reserves the resource for the acknowledgment feedback and triggers the at least one receiver UE to send the acknowledgment feedback.

Aspect 3: The method of any of Aspects 1-2, wherein: the determination involves a clear channel assessment (CCA) based on at least one of energy or power detected during a sensing period; and the resource is determined to be available if the detected energy or power is equal to or less than a threshold.

Aspect 4: The method of Aspect 3, wherein the transmitter UE transmits the reservation signal if the detected energy or power is equal to or less than the threshold.

Aspect 5. The method of Aspect 3, further comprising performing a backoff procedure if the CCA indicates the channel is free based on the detected energy or power is equal to or less than the threshold, wherein the transmitter UE transmits the reservation signal if the channel remains free during the backoff procedure.

Aspect 6: The method of any of Aspects 1-5, wherein the determination is that the resource is available if: the slot is within an channel occupancy time (COT) initiated by the transmitter UE or another UE; and a previous slot has been occupied by a sidelink transmission by the transmitter UE or the other UE.

Aspect 7: The method of Aspect 6, further comprising determining the previous slot has been occupied by the other UE by decoding at least one of a sidelink control signaling or a data transmission from the other UE.

Aspect 8: The method of any of Aspects 1-7, wherein the slot comprises one of a set of slots configured for the acknowledgment feedback.

Aspect 9: The method of Aspect 8, wherein transmitter UE determines the resource availability and transmits the reservation signal in an earliest of the configured slots that satisfies an acknowledgment feedback timeline condition.

Aspect 10: The method of any of Aspects 1-9, wherein the slot is determined based an acknowledgment feedback timeline condition.

Aspect 11: The method of Aspect 10, wherein the data transmission comprises an indication of the acknowledgment feedback timeline condition.

Aspect 12: The method of any of Aspects 1-11, further comprising monitoring for the acknowledgment feedback regardless of whether the reservation signal is transmitted.

Aspect 13: The method of any of Aspects 1-12, further comprising, if the determination is that the resource is not available: deciding to not monitor for the acknowledgment feedback from the at least one receiver UE; or monitoring for the acknowledgment feedback from the at least one receiver UE according to an acknowledgment feedback transmission window.

Aspect 14: The method of any of Aspects 1-13, wherein the slot is one of multiple acknowledgment feedback slots within an acknowledgment feedback window; and if the determination is that the resource is not available in the slot, the method further comprises determining if a resource in a subsequent slot in the acknowledgment feedback window is available for the at least one receiver UE to provide the acknowledgment feedback for the data transmission.

Aspect 15: The method of any of Aspects 1-14, wherein the reservation signal is transmitted in a portion of frequency resources in the unlicensed spectrum used for sidelink communication.

Aspect 16: The method of Aspect 15, further comprising receiving the acknowledgment feedback via the same portion of frequency resources in the unlicensed spectrum used for sidelink communication.

Aspect 17: The method of any of Aspects 1-16, wherein the reservation signal is transmitted in a same portion of frequency resources used for transmitting the acknowledgment feedback.

Aspect 18: The method of any of Aspects 1-17, wherein reservation signals from multiple transmitter UEs including the transmitter UE are frequency division multiplexed (FDMed) in the same slot.

Aspect 19: The method of any of Aspects 1-18, further comprising receiving the acknowledgment feedback via a portion of frequency resources in the unlicensed spectrum used for sidelink communication.

Aspect 20: The method of any of Aspects 1-19, further comprising receiving the acknowledgement feedback via a set of frequency resources that at least partially overlap with frequency resources in the unlicensed spectrum used for sidelink communication.

Aspect 21: The method of any of Aspects 1-20, wherein at least one of: acknowledgment feedbacks for different data transmissions are frequency division multiplexed (FDMed) in the same slot; or acknowledgment feedbacks from different ones of the at least one receiver UE are frequency division multiplexed (FDMed) in the same slot.

Aspect 22: A method for wireless communications by a receiver user equipment (UE), comprising: receiving a data transmission from at least one transmitter UE in an unlicensed spectrum used for sidelink communication; monitoring for a reservation signal from the at least one transmitter UE indicating a resource in a slot is available for the receiver UE to provide an acknowledgment feedback for the data transmission; and transmitting the acknowledgment feedback for the data transmission if the reservation signal is detected.

Aspect 23: The method of Aspect 22, wherein the slot comprises one of a set of slots configured for acknowledgment feedback.

Aspect 24: The method of any of Aspects 22-23, wherein the data transmission comprises an acknowledgment feedback timeline condition when transmitting the data, and the receiver UE transmits the acknowledgment feedback in accordance with the acknowledgment feedback timeline condition.

Aspect 25: The method of any of Aspects 22-24, further comprising transmitting the acknowledgment feedback even if the reservation signal is not detected.

Aspect 26: The method of any of Aspects 22-25, wherein the acknowledgment feedback is transmitted according to an acknowledgment feedback transmission window.

Aspect 27: The method of any of Aspects 22-26, wherein the reservation signal is monitored for in a portion of frequency resources in the unlicensed spectrum used for sidelink communication.

Aspect 28: The method of any of Aspects 22-27, wherein the reservation signal is monitored for in a same portion of frequency resources used for transmitting the acknowledgment feedback.

Aspect 29: The method of any of Aspects 22-28, wherein the at least one transmitter UE comprises multiple transmitter UEs, and reservation signals from the multiple transmitter UEs are frequency division multiplexed (FDMed) in the same slot.

Aspect 30: The method of any of Aspects 22-29, wherein the acknowledgment feedback is transmitted in a portion of frequency resources in the unlicensed spectrum used for sidelink communication.

Aspect 31: The method of any of Aspects 22-30, wherein at least one of: acknowledgment feedbacks for different data transmissions are frequency division multiplexed (FDMed) in the same slot; or acknowledgment feedbacks from different receiver UEs including the receiver UE are frequency division multiplexed (FDMed) in the same slot.

Aspect 32: A transmitter user equipment (UE), comprising: means for transmitting data to at least one receiver UE in an unlicensed spectrum used for sidelink communication; means for determining if a resource in a slot is available for the at least one receiver UE to provide an acknowledgment feedback for the data transmission; and means for transmitting a reservation signal in the slot if the resource is determined to be available.

Aspect 33: The transmitter UE of Aspect 32, wherein the reservation signal reserves the resource for the acknowledgment feedback and triggers the at least one receiver UE to send the acknowledgment feedback.

Aspect 34: The transmitter UE of any of Aspects 32-33, wherein the determination involves a clear channel assessment (CCA) based on at least one of energy or power detected during a sensing period, and the resource is determined to be available if the detected energy or power is equal to or less than a threshold.

Aspect 35: The transmitter UE of Aspect 34, wherein the transmitter UE transmits the reservation signal if the detected energy or power is equal to or less than the threshold.

Aspect 36. The transmitter UE of Aspect 34, further comprising means for performing a backoff procedure if the CCA indicates the channel is free based on the detected energy or power is equal to or less than the threshold, wherein the transmitter transmits the reservation signal if the channel remains free during the backoff procedure.

Aspect 37: The transmitter UE of any of Aspects 32-36, wherein the determination is that the resource is available if: the slot is within a channel occupancy time (COT) initiated by the transmitter UE or another UE; and a previous slot has been occupied by a sidelink transmission by the transmitter UE or the other UE.

Aspect 38: The transmitter UE of Aspect 37, further comprising means for determining the previous slot has been occupied by the other UE by decoding at least one of a sidelink control signaling or a data transmission from the other UE.

Aspect 39: The transmitter UE of any of Aspects 32-38, wherein the slot comprises one of a set of slots configured for the acknowledgment feedback.

Aspect 40: The transmitter UE of Aspect 39, wherein transmitter UE determines the resource availability and transmits the reservation signal in an earliest of the configured slots that satisfies an acknowledgment feedback timeline condition.

Aspect 41: The transmitter UE of any of Aspects 32-40, wherein the slot is determined based an acknowledgment feedback timeline condition.

Aspect 42: The transmitter UE of Aspect 41, wherein the data transmission comprises an indication of the acknowledgment feedback timeline condition.

Aspect 43: The transmitter UE of any of Aspects 32-42, further comprising means for monitoring for the acknowledgment feedback regardless of whether the reservation signal is transmitted.

Aspect 44: The transmitter UE of any of Aspects 32-43, further comprising, if the determination is that the resource is not available: means for deciding to not monitor for the acknowledgment feedback from the at least one receiver UE; or means for monitoring for the acknowledgment feedback from the at least one receiver UE according to an acknowledgment feedback transmission window.

Aspect 45: The transmitter UE of any of Aspects 32-44, wherein the slot is one of multiple acknowledgment feedback slots within an acknowledgment feedback window, and if the determination is that the resource is not available in the slot, the transmitter UE further comprises means for determining if a resource in a subsequent slot in the acknowledgment feedback window is available for the at least one receiver UE to provide the acknowledgment feedback for the data transmission.

Aspect 46: The transmitter UE of any of Aspects 32-45, wherein the reservation signal is transmitted in a portion of frequency resources in the unlicensed spectrum used for sidelink communication.

Aspect 47: The transmitter UE of Aspect 46, further comprising means for receiving the acknowledgment feedback via the same portion of frequency resources in the unlicensed spectrum used for sidelink communication.

Aspect 48: The transmitter UE of any of Aspects 32-47, wherein the reservation signal is transmitted in a same portion of frequency resources used for transmitting the acknowledgment feedback.

Aspect 49: The transmitter UE of any of Aspects 32-48, wherein reservation signals from multiple transmitter UEs including the transmitter UE are frequency division multiplexed (FDMed) in the same slot.

Aspect 50: The transmitter UE of any of Aspects 32-49, further comprising means for receiving the acknowledgment feedback via a portion of frequency resources in the unlicensed spectrum used for sidelink communication.

Aspect 51: The transmitter UE of any of Aspects 32-50 further comprising means for receiving the acknowledgement feedback via a set of frequency resources that at least partially overlap with frequency resources in the unlicensed spectrum used for sidelink communication.

Aspect 52: The transmitter UE of any of Aspects 32-51, wherein at least one of: acknowledgment feedbacks for different data transmissions are frequency division multiplexed (FDMed) in the same slot; or acknowledgment feedbacks from different ones of the at least one receiver UE are frequency division multiplexed (FDMed) in the same slot.

Aspect 53: A receiver user equipment (UE), comprising: means for receiving a data transmission from at least one transmitter UE in an unlicensed spectrum used for sidelink communication; means for monitoring for a reservation signal from the at least one transmitter UE indicating a resource in a slot is available for the receiver UE to provide an acknowledgment feedback for the data transmission; and means for transmitting the acknowledgment feedback for the data transmission if the reservation signal is detected.

Aspect 54: The receiver UE of Aspect 53, wherein the slot comprises one of a set of slots configured for acknowledgment feedback.

Aspect 55: The receiver UE of any of Aspects 53-54, wherein the data transmission comprises an acknowledgment feedback timeline condition when transmitting the data; and the receiver UE transmits the acknowledgment feedback in accordance with the acknowledgment feedback timeline condition.

Aspect 56: The receiver UE of any of Aspects 53-55, further comprising means for transmitting the acknowledgment feedback even if the reservation signal is not detected.

Aspect 57: The receiver UE of any of Aspects 53-56, wherein the acknowledgment feedback is transmitted according to an acknowledgment feedback transmission window.

Aspect 58: The receiver UE of any of Aspects 53-57, wherein the reservation signal is monitored for in a portion of frequency resources in the unlicensed spectrum used for sidelink communication.

Aspect 59: The receiver UE of any of Aspects 53-58, wherein the reservation signal is monitored for in a same portion of frequency resources used for transmitting the acknowledgment feedback.

Aspect 60: The receiver UE of any of Aspects 53-59, wherein the at least one transmitter UE comprises multiple transmitter UEs, and reservation signals from the multiple transmitter UEs are frequency division multiplexed (FDMed) in the same slot.

Aspect 61: The receiver UE of any of Aspects 53-60, wherein the acknowledgment feedback is transmitted in a portion of frequency resources in the unlicensed spectrum used for sidelink communication.

Aspect 62: The receiver UE of any of Aspects 53-61, wherein at least one of: acknowledgment feedbacks for different data transmissions are frequency division multiplexed (FDMed) in the same slot; or acknowledgment feedbacks from different receiver UEs including the receiver UE are frequency division multiplexed (FDMed) in the same slot.

Aspect 63: A transmitter user equipment (UE), comprising: a transmitter configured to transmit data to at least one receiver UE in an unlicensed spectrum used for sidelink communication; and a processing system configured to determine if a resource in a slot is available for the at least one receiver UE to provide an acknowledgment feedback for the data transmission, wherein the transmitter is further configured to transmit a reservation signal in the slot if the resource is determined to be available.

Aspect 64: The transmitter UE of Aspect 63, wherein the reservation signal reserves the resource for the acknowledgment feedback and triggers the at least one receiver UE to send the acknowledgment feedback.

Aspect 65: The transmitter UE of any of Aspects 63-64, wherein the determination involves a clear channel assessment (CCA) based on at least one of energy or power detected during a sensing period, and the resource is determined to be available if the detected energy or power is equal to or less than a threshold.

Aspect 66: The transmitter UE of Aspect 65, wherein the transmitter transmits the reservation signal if the detected energy or power is equal to or less than the threshold.

Aspect 67: The transmitter UE of Aspect 65, wherein the processing system is further configured to perform a backoff procedure if the CCA indicates the channel is free based on the detected energy or power is equal to or less than the threshold, and the transmitter transmits the reservation signal if the channel remains free during the backoff procedure.

Aspect 68: The transmitter UE of any of Aspects 63-67, wherein the determination is that the resource is available if: the slot is within an channel occupancy time (COT) initiated by the transmitter UE or another UE; and a previous slot has been occupied by a sidelink transmission by the transmitter UE or the other UE.

Aspect 69: The transmitter UE of Aspect 68, wherein the processing system is further configured to determine the previous slot has been occupied by the other UE by decoding at least one of a sidelink control signaling or a data transmission from the other UE.

Aspect 70: The transmitter UE of any of Aspects 63-69, wherein the slot comprises one of a set of slots configured for the acknowledgment feedback.

Aspect 71: The transmitter UE of Aspect 70, wherein transmitter UE determines the resource availability and transmits the reservation signal in an earliest of the configured slots that satisfies an acknowledgment feedback timeline condition.

Aspect 72: The transmitter UE of any of Aspects 63-71, wherein the slot is determined based an acknowledgment feedback timeline condition.

Aspect 73. The transmitter UE of Aspect 72, wherein the data transmission comprises an indication of the acknowledgment feedback timeline condition.

Aspect 74: The transmitter UE of any of Aspects 63-73, wherein the processing system is further configured to monitor for the acknowledgment feedback regardless of whether the reservation signal is transmitted.

Aspect 75: The transmitter UE of any of Aspects 63-74, wherein the processing system is further configured to, if the determination is that the resource is not available: decide to not monitor for the acknowledgment feedback from the at least one receiver UE; or monitor for the acknowledgment feedback from the at least one receiver UE according to an acknowledgment feedback transmission window.

Aspect 76: The transmitter UE of any of Aspects 63-75, wherein the slot is one of multiple acknowledgment feedback slots within an acknowledgment feedback window, and if the determination is that the resource is not available in the slot, the processing system is further configured to determine if a resource in a subsequent slot in the acknowledgment feedback window is available for the at least one receiver UE to provide the acknowledgment feedback for the data transmission.

Aspect 77: The transmitter UE of any of Aspects 63-76, wherein the reservation signal is transmitted in a portion of frequency resources in the unlicensed spectrum used for sidelink communication.

Aspect 78: The transmitter UE of Aspect 77, further comprising a receiver configured to receive the acknowledgment feedback via the same portion of frequency resources in the unlicensed spectrum used for sidelink communication.

Aspect 79: The transmitter UE of any of Aspects 63-78, wherein the reservation signal is transmitted in a same portion of frequency resources used for transmitting the acknowledgment feedback.

Aspect 80: The transmitter UE of any of Aspects 63-79, wherein reservation signals from multiple transmitter UEs including the transmitter UE are frequency division multiplexed (FDMed) in the same slot.

Aspect 81: The transmitter UE of any of Aspects 63-80, further comprising a receiver configured to receive the acknowledgment feedback via a portion of frequency resources in the unlicensed spectrum used for sidelink communication.

Aspect 82: The transmitter UE of any of Aspects 63-81, further comprising a receiver configured to receive the acknowledgement feedback via a set of frequency resources that at least partially overlap with frequency resources in the unlicensed spectrum used for sidelink communication.

Aspect 83: The transmitter UE of any of Aspects 63-82, wherein at least one of: acknowledgment feedbacks for different data transmissions are frequency division multiplexed (FDMed) in the same slot; or acknowledgment feedbacks from different ones of the at least one receiver UE are frequency division multiplexed (FDMed) in the same slot.

Aspect 84: A receiver user equipment (UE), comprising: a receiver configured to receive a data transmission from at least one transmitter UE in an unlicensed spectrum used for sidelink communication; a processing system configured to monitor for a reservation signal from the at least one transmitter UE indicating a resource in a slot is available for the receiver UE to provide an acknowledgment feedback for the data transmission; and a transmitter configured to transmit the acknowledgment feedback for the data transmission if the reservation signal is detected.

Aspect 85: The receiver UE of Aspect 84, wherein the slot comprises one of a set of slots configured for acknowledgment feedback.

Aspect 86: The receiver UE of any of Aspects 84-85, wherein the data transmission comprises an acknowledgment feedback timeline condition when transmitting the data, and the transmitter transmits the acknowledgment feedback in accordance with the acknowledgment feedback timeline condition.

Aspect 87: The receiver UE of any of Aspects 84-86, wherein the transmitter is further configured to transmit the acknowledgment feedback even if the reservation signal is not detected.

Aspect 88: The receiver UE of any of Aspects 84-87, wherein the acknowledgment feedback is transmitted according to an acknowledgment feedback transmission window.

Aspect 89: The receiver UE of any of Aspects 84-88, wherein the reservation signal is monitored for in a portion of frequency resources in the unlicensed spectrum used for sidelink communication.

Aspect 90: The receiver UE of any of Aspects 84-89, wherein the reservation signal is monitored for in a same portion of frequency resources used for transmitting the acknowledgment feedback.

Aspect 91: The receiver UE of any of Aspects 84-90, wherein: the at least one transmitter UE comprises multiple transmitter UEs; and reservation signals from the multiple transmitter UEs are frequency division multiplexed (FDMed) in the same slot.

Aspect 92: The receiver UE of any of Aspects 84-91, wherein the acknowledgment feedback is transmitted in a portion of frequency resources in the unlicensed spectrum used for sidelink communication.

Aspect 93: The receiver UE of any of Aspects 84-92, wherein at least one of: acknowledgment feedbacks for different data transmissions are frequency division multiplexed (FDMed) in the same slot; or acknowledgment feedbacks from different receiver UEs including the receiver UE are frequency division multiplexed (FDMed) in the same slot.

Aspect 94: An apparatus for wireless communications, comprising: an interface configured to output data for transmission to at least one user equipment (UE) in an unlicensed spectrum used for sidelink communication; and a processing system configured to determine if a resource in a slot is available for the at least one UE to provide an acknowledgment feedback for the data transmission, wherein the interface is further configured to output, for transmission, a reservation signal in the slot if the resource is determined to be available.

Aspect 95: An apparatus for wireless communications by a receiver user equipment (UE), comprising: an interface configured to obtain a data transmission from at least one transmitter UE in an unlicensed spectrum used for sidelink communication; and a processing system configured to monitor for a reservation signal from the at least one transmitter UE indicating a resource in a slot is available for the receiver UE to provide an acknowledgment feedback for the data transmission, wherein the interface is further configured to output, for transmission, the acknowledgment feedback for the data transmission if the reservation signal is detected.

Aspect 96: A computer-readable medium for wireless communications, comprising codes executable to: output data for transmission to at least one user equipment (UE) in an unlicensed spectrum used for sidelink communication; determine if a resource in a slot is available for the at least one UE to provide an acknowledgment feedback for the data transmission; and output, for transmission, a reservation signal in the slot if the resource is determined to be available.

Aspect 97: A computer-readable medium for wireless communications by a receiver user equipment (UE), comprising codes executable to: obtain a data transmission from at least one transmitter UE in an unlicensed spectrum used for sidelink communication; monitor for a reservation signal from the at least one transmitter UE indicating a resource in a slot is available for the receiver UE to provide an acknowledgment feedback for the data transmission; and output, for transmission, the acknowledgment feedback for the data transmission if the reservation signal is detected.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations 600 of FIG. 6 and operations 700 of FIG. 7.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for determining, means for performing, means for deciding and means for monitoring may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a transmitter user equipment (UE), comprising:
   transmitting data to at least one receiver UE in an unlicensed spectrum used for sidelink communication;
   determining if a resource in a slot is available for the at least one receiver UE to provide an acknowledgment feedback for the data transmission, wherein the determination is that the resource is available if the slot is within a channel occupancy time (COT) initiated by the transmitter UE or another UE; and
   transmitting a reservation signal in the slot if the resource is determined to be available.

2. The method of claim 1, wherein the reservation signal reserves the resource for the acknowledgment feedback and triggers the at least one receiver UE to send the acknowledgment feedback.

3. The method of claim 1, wherein:
the determination involves a clear channel assessment (CCA) based on at least one of energy or power detected during a sensing period; and
the determination is further that the resource is available if the detected energy or power is equal to or less than a threshold.

4. The method of claim 3, wherein:
the transmitter UE transmits the reservation signal if the detected energy or power is equal to or less than the threshold.

5. The method of claim 3, further comprising performing a backoff procedure if the CCA indicates the channel is free based on the detected energy or power is equal to or less than the threshold, wherein:
the transmitter UE transmits the reservation signal if the channel remains free during the backoff procedure.

6. The method of claim 1, wherein the COT is associated with a contention window and the determination is further that the resource is available if:
a previous slot has been occupied by a sidelink transmission by the transmitter UE or the other UE.

7. The method of claim 6, further comprising determining the previous slot has been occupied by the other UE by decoding at least one of a sidelink control signaling or a data transmission from the other UE.

8. The method of claim 1, wherein the slot comprises one of a set of slots configured for the acknowledgment feedback and wherein transmitter UE determines the resource availability and transmits the reservation signal in an earliest of the configured slots that satisfies an acknowledgment feedback timeline condition.

9. The method of claim 1, wherein the slot is determined based an acknowledgment feedback timeline condition and wherein the data transmission comprises an indication of the acknowledgment feedback timeline condition.

10. The method of claim 1, further comprising monitoring for the acknowledgment feedback regardless of whether the reservation signal is transmitted.

11. The method of claim 1, further comprising, if the determination is that the resource is not available:
deciding to not monitor for the acknowledgment feedback from the at least one receiver UE; or
monitoring for the acknowledgment feedback from the at least one receiver UE according to an acknowledgment feedback transmission window.

12. The method of claim 1, wherein:
the slot is one of multiple acknowledgment feedback slots within an acknowledgment feedback window; and
if the determination is that the resource is not available in the slot, the method further comprises determining if a resource in a subsequent slot in the acknowledgment feedback window is available for the at least one receiver UE to provide the acknowledgment feedback for the data transmission.

13. The method of claim 1, wherein the reservation signal is transmitted in a portion of frequency resources in the unlicensed spectrum used for sidelink communication.

14. The method of claim 13, further comprising receiving the acknowledgment feedback via the same portion of frequency resources in the unlicensed spectrum used for sidelink communication.

15. The method of claim 1, wherein the reservation signal is transmitted in a same portion of frequency resources used for transmitting the acknowledgment feedback.

16. The method of claim 1, wherein reservation signals from multiple transmitter UEs including the transmitter UE are frequency division multiplexed (FDMed) in the same slot.

17. The method of claim 1, further comprising receiving the acknowledgment feedback via a portion of frequency resources in the unlicensed spectrum used for sidelink communication.

18. The method of claim 1, further comprising receiving the acknowledgement feedback via a set of frequency resources that at least partially overlap with frequency resources in the unlicensed spectrum used for sidelink communication.

19. A method for wireless communications by a receiver user equipment (UE), comprising:
receiving a data transmission from at least one transmitter UE in an unlicensed spectrum used for sidelink communication;
monitoring for a reservation signal from the at least one transmitter UE indicating a resource in a slot is available for the receiver UE to provide an acknowledgment feedback for the data transmission, wherein the resource is available if the slot is within a channel occupancy time (COT) initiated by the at least one transmitter UE or another UE; and
transmitting the acknowledgment feedback for the data transmission if the reservation signal is detected.

20. The method of claim 19, wherein the slot comprises one of a set of slots configured for acknowledgment feedback.

21. The method of claim 19, wherein:
the data transmission comprises an acknowledgment feedback timeline condition when transmitting the data; and
the receiver UE transmits the acknowledgment feedback in accordance with the acknowledgment feedback timeline condition.

22. The method of claim 19, further comprising transmitting the acknowledgment feedback even if the reservation signal is not detected.

23. The method of claim 19, wherein the acknowledgment feedback is transmitted according to an acknowledgment feedback transmission window.

24. The method of claim 19, wherein the reservation signal is monitored for in a portion of frequency resources in the unlicensed spectrum used for sidelink communication.

25. The method of claim 19, wherein the reservation signal is monitored for in a same portion of frequency resources used for transmitting the acknowledgment feedback.

26. The method of claim 19, wherein:
the at least one transmitter UE comprises multiple transmitter UEs; and
reservation signals from the multiple transmitter UEs are frequency division multiplexed (FDMed) in the same slot.

27. The method of claim 19, wherein the acknowledgment feedback is transmitted in a portion of frequency resources in the unlicensed spectrum used for sidelink communication.

28. The method of claim 19, wherein at least one of:
acknowledgment feedbacks for different data transmissions are frequency division multiplexed (FDMed) in the same slot; or
acknowledgment feedbacks from different receiver UEs including the receiver UE are frequency division multiplexed (FDMed) in the same slot.

29. A transmitter user equipment (UE) for wireless communication, comprising a processing system that includes one or more processors and one or more memories coupled with the one or more processors, the processing system configured to cause the transmitter UE to:
- transmit data to at least one receiver UE in an unlicensed spectrum used for sidelink communication;
- determine if a resource in a slot is available for the at least one receiver UE to provide an acknowledgment feedback for the data transmission, wherein the determination is that the resource is available if the slot is within a channel occupancy time (COT) initiated by the transmitter UE or another UE; and
- transmit a reservation signal in the slot if the resource is determined to be available.

30. A receiver user equipment (UE) for wireless communication, comprising a processing system that includes one or more processors and one or more memories coupled with the one or more processors, the processing system configured to cause the receiver UE to:
- receive a data transmission from at least one transmitter UE in an unlicensed spectrum used for sidelink communication;
- monitor for a reservation signal from the at least one transmitter UE indicating a resource in a slot is available for the receiver UE to provide an acknowledgment feedback for the data transmission, wherein the resource is available if the slot is within a channel occupancy time (COT) initiated by the at least one transmitter UE or another UE; and
- transmit the acknowledgment feedback for the data transmission if the reservation signal is detected.

* * * * *